United States Patent
Dahl

(10) Patent No.: US 8,548,139 B2
(45) Date of Patent: Oct. 1, 2013

(54) SYSTEM AND METHOD FOR VERIFYING A VIDEO CALL NUMBER ENTRY IN A DIRECTORY

(75) Inventor: Axel Dahl, San Diego, CA (US)

(73) Assignee: Cisco Technology Inc., San Jose, CA (US)

(*) Notice: Subject to any disclaimer, the term of this patent is extended or adjusted under 35 U.S.C. 154(b) by 237 days.

(21) Appl. No.: 13/161,173

(22) Filed: Jun. 15, 2011

(65) Prior Publication Data

US 2011/0310212 A1    Dec. 22, 2011

Related U.S. Application Data

(60) Provisional application No. 61/355,810, filed on Jun. 17, 2010.

(30) Foreign Application Priority Data

Jun. 17, 2010 (NO) .................................. 20100867

(51) Int. Cl.
*H04M 1/56* (2006.01)

(52) U.S. Cl.
USPC .................................. 379/142.05; 348/14.01

(58) Field of Classification Search
USPC ............... 379/142.05, 142.06, 201.03, 93.25; 348/14.01
See application file for complete search history.

(56) References Cited

U.S. PATENT DOCUMENTS

| | | | |
|---|---|---|---|
| 8,406,392 B2 * | 3/2013 | Tan ............................ | 379/93.02 |
| 2005/0097363 A1 | 5/2005 | Bajko et al. | |
| 2008/0022375 A1 | 1/2008 | Stanley | |
| 2009/0232129 A1 * | 9/2009 | Wong et al. ................... | 370/352 |
| 2009/0309698 A1 * | 12/2009 | Headley et al. .............. | 340/5.52 |
| 2010/0095350 A1 | 4/2010 | Lazar et al. | |

FOREIGN PATENT DOCUMENTS

WO    WO 2010/019348 A2    2/2010

OTHER PUBLICATIONS

International-Type Search Report issued Dec. 9, 2010 in National Application 20100/0807 filed Jun. 17, 2010.
Norwegian Office Action issued Jan. 17, 2011, in Norway Patent Application No. 20100867, filed Jun. 17, 2010.
Sajad Shirali-Shahreza, "Bibliography of Works Done on CAPTCHA", Intelligent System and Knowledge Engineering, 2008, ISKE 2008, 34d International Conference on, IEEE, Piscataway, NJ, USA, Nov. 17, 2008, pp. 205-210.
"Secure Multi-Image CAPTCHA", IP.COM Journal, IP.COM Inc., West Henrietta, NY, US, Jan. 6, 2010, XP013136287, issn: 1533-0001.
Jing-Song Cui, et al., "A CAPTCHA Implementation Based on 3D Animation", 2009 International Conference on Multimedia Information Networking and Security, MINES '09, IEEE, Piscataway, NJ, USA, Nov. 18, 2009, pp. 179-182.

* cited by examiner

*Primary Examiner* — Olisa Anwah
(74) *Attorney, Agent, or Firm* — Oblon, Spivak, McClelland, Maier & Neustadt, L.L.P.

(57) ABSTRACT

A system and method allowing users of video call endpoints to register their video call addresses in a local, regional and/or global directory, where the directory is configured to validate whether the video call address is a valid accessible address and that the user registering the video call number actually has physical access to the a video call device using the video call address.

17 Claims, 4 Drawing Sheets

SYSTEM AND METHOD FOR VERIFYING A VIDEO CALL NUMBER ENTRY IN A DIRECTORY

CROSS-REFERENCE TO RELATED APPLICATIONS

The present application claims the benefit of U.S. provisional application No. 61/355,810, filed Jun. 17, 2010. The present application also claims the benefit of priority under 35 U.S.C. §119 to Norwegian patent application no. NO20100867, filed Jun. 17, 2010. 61/335,810 and NO20100867 are hereby incorporated by reference in their entirety.

TECHNOLOGICAL FIELD

The exemplary embodiments described herein relate to managing a directory of video call numbers, and in particular to a system and method of verifying a video call number entry in the directory.

BACKGROUND

For many decades, the standard means of real-time, long-distance communication has been the telephone. Almost every individual within an organization will have a telephone number which is globally unique and from which they can be reached by any telephone in the world.

In more recent years, calls via IP (Internet Protocol) have been gaining prominence, as they have a number of advantages. Call via IP may be free at the point of use, may offer better audio fidelity using high-quality audio codecs, and may allow video and data sharing as well as simply voice.

Currently, individuals generally provide their contact information in the form of a telephone number, which is short, globally unique, easy to use and works between organizations which have had no previous contact. For IP-media calls, in the following referred to as video calls, several different addressing or number schemes have been developed following the idea of telephone numbers, including but not limited to E.164 (network access number, telephone number, etc.), H.323 IDs (alphanumeric strings representing names, e-mail-like addresses, etc.), and any others defined in Recommendation H.225.0. The video call numbers or video-URIs are unique within a Zone, Domain, among Zones, and among Domains.

Within a network, many IP setups support ways of mitigating the complexity of making an IP media calls, e.g. preconfigured address books on an endpoint let a user call an individual by selecting them from a list. These solutions generally only work within an organization, since they rely on endpoints and servers having the information available to them already, as such they only allow individuals to call users whose details are already in the system.

This becomes problematic when an individual wishes to call a user from a different organization, one whose details are not already known to the individual wishing to make the call.

Norwegian patent application 20092479, the entire contents of which are hereby incorporated by reference, describes a Global Address Database allowing an individual using an IP communication device to contact an individual in an external organization using a single identifier, such as a telephone number, without the caller having any knowledge of the IP capabilities of the called individual. Call servers compatible with this new system will register the range of telephone numbers through which their users can be reached with an address registry or set of registries globally accessible via the Internet.

Another possible solution would be to allow users, individuals and/or organizations, to register their video call numbers with a directory of video call numbers. However, when allowing everyone to register video call numbers with the directory, there is a possibility that someone could register video call numbers that are not a valid address to a real video call endpoint.

Further, many ITSPs (Internet Telephony Service Providers) block video call requests from clients outside the ITSPs domain. In this case, a video call from a first video endpoint outside a ITSPs domain to a second video endpoint inside the ITSPs fails even though the second endpoint has a valid address inside the ITSPs domain. Thus, addresses within an ITSP domain blocking outside video call requests should be considered invalid by a global directory.

SUMMARY

An exemplary embodiment is a system including: a computer that is configured to be communicatively connected to a computer network, the computer including a client interface, an application unit and a video calling unit, wherein the computer is configured to provide a directory of video call numbers, the client interface is configured to receive a video call number for entry in the directory, and to submit the received video call number to the application unit to initiate verification of the video call number, receive a registration challenge response, and submit the received registration challenge response to the application unit, which is configured to validate the registration challenge response; the application unit is configured to receive the video call number from the client interface for verification, generate a registration challenge, store the registration challenge and the video call number in a session, submit the registration challenge and the video call number to the video calling unit, receive the registration challenge response from the client interface, load the registration challenge from the session, and upon finding a positive match between the registration challenge and the registration challenge response, updates the directory to indicate the video call number is valid; and the video calling unit is configured to receive the video call number and the registration challenge from the application unit, initiate a video call session to the video call number, and upon successful initiation of the video call session, present the registration challenge over the video call session.

An exemplary method includes: receiving, at a computer, a video call number, wherein the computer includes a client interface connected to a computer network, an application unit, and a video calling unit, and the computer is configured to provide a directory of video call numbers; generating, by the application unit, a registration challenge; initiating, by the video calling unit, a video call session to the video call number; presenting a registration challenge over the video call session; receiving a registration challenge response entered using the client interface; and upon finding a positive match between the registration challenge and the registration challenge response, updating the directory indicating that the video call number is valid.

Another exemplary embodiment includes a non-transitory computer readable storage medium encoded with instructions, which when executed by a computer causes the computer to implement the above-noted method.

BRIEF DESCRIPTION OF THE DRAWINGS

In order to make the exemplary embodiments discussed herein more readily understandable, the discussion that follows will refer to the accompanying drawings, wherein.

DETAILED DESCRIPTION

In the following, exemplary embodiments are discussed by referring to the accompanying drawings. However, people skilled in the art will realize other applications and modifications within the scope of the invention as defined in the claims.

An exemplary embodiment described herein pertains to a system and method for allowing users of video call endpoints to register their video call addresses in a local, regional and/or global directory, where the directory is embodied in a computer or server configured to validate whether the video call address is a valid accessible address and that the user registering the video call number actually has physical access to the video call device using the video call address.

Figure 1:
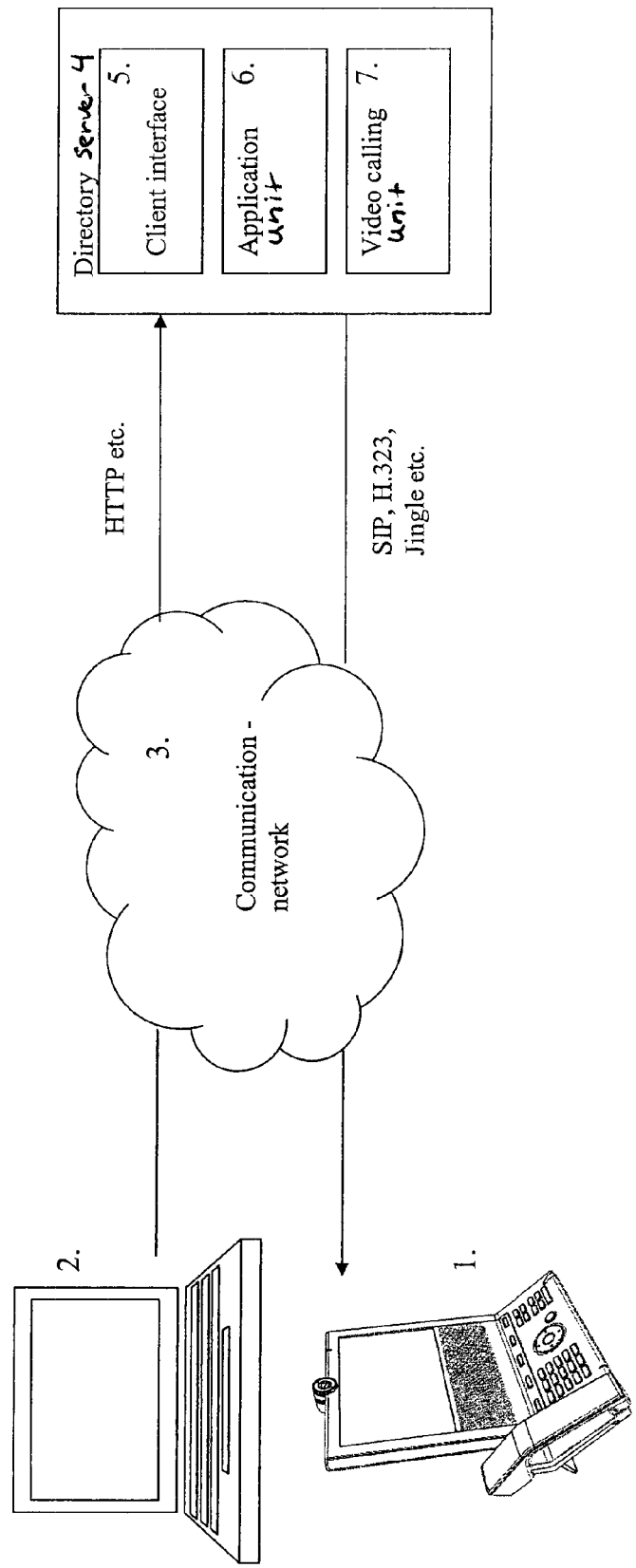
FIG. 1 illustrates an exemplary communication system.

FIG. 1 is a block diagram showing an exemplary communication system.

The exemplary system comprises a video call endpoint 1, a personal computer (PC) 2, a communication network 3 and a Directory server 4 (which may be embodied as, for example, a computer such as an MCU, gateway, or server), wherein the Directory server 4 further comprises a Client Interface 5, an Application unit 6 (which may be executed by a processor in the directory server) and a Video calling unit 7 (which may be executed by a processor in the directory server). The communication network 3 is typically a packet switched network employing the IP-protocol. The PC 2 is typically employing the HTTP protocol over the communication network 3 when communicating with the Client interface 5. The Video calling unit 7 typically employs media call protocols such as H.323, SIP, Jingle etc. when communicating with the video call endpoint 1. Although, the Video call endpoint 1 and the PC 2 for simplicity are shown as two separate units, both units could be incorporated within a single device where the Video call endpoint 1 and the PC 2, are two different application using different application protocols. As depicted in FIG. 1, the Directory server communicates with both the Video call endpoint 1 and the PC 2 over the same communication network, but it some situations where Quality Of Service is of high importance it might also be useful to use a separate communication network for the media calls.

The client interface 5 is typically in a HTML, Java, or similar web page format. The client interface typically includes listings of video call numbers uploaded into the directory, search functions to find video call numbers in the directory and the possibility to upload video call numbers into the directory. When a user registers a video call number, the video call number will be tagged "Not verified". A "Verify Video call number" button is typically displayed next to each video call number tagged "Not verified", where pressing the button initiates a verification process illustrated by FIG. 2.

Figure 2:
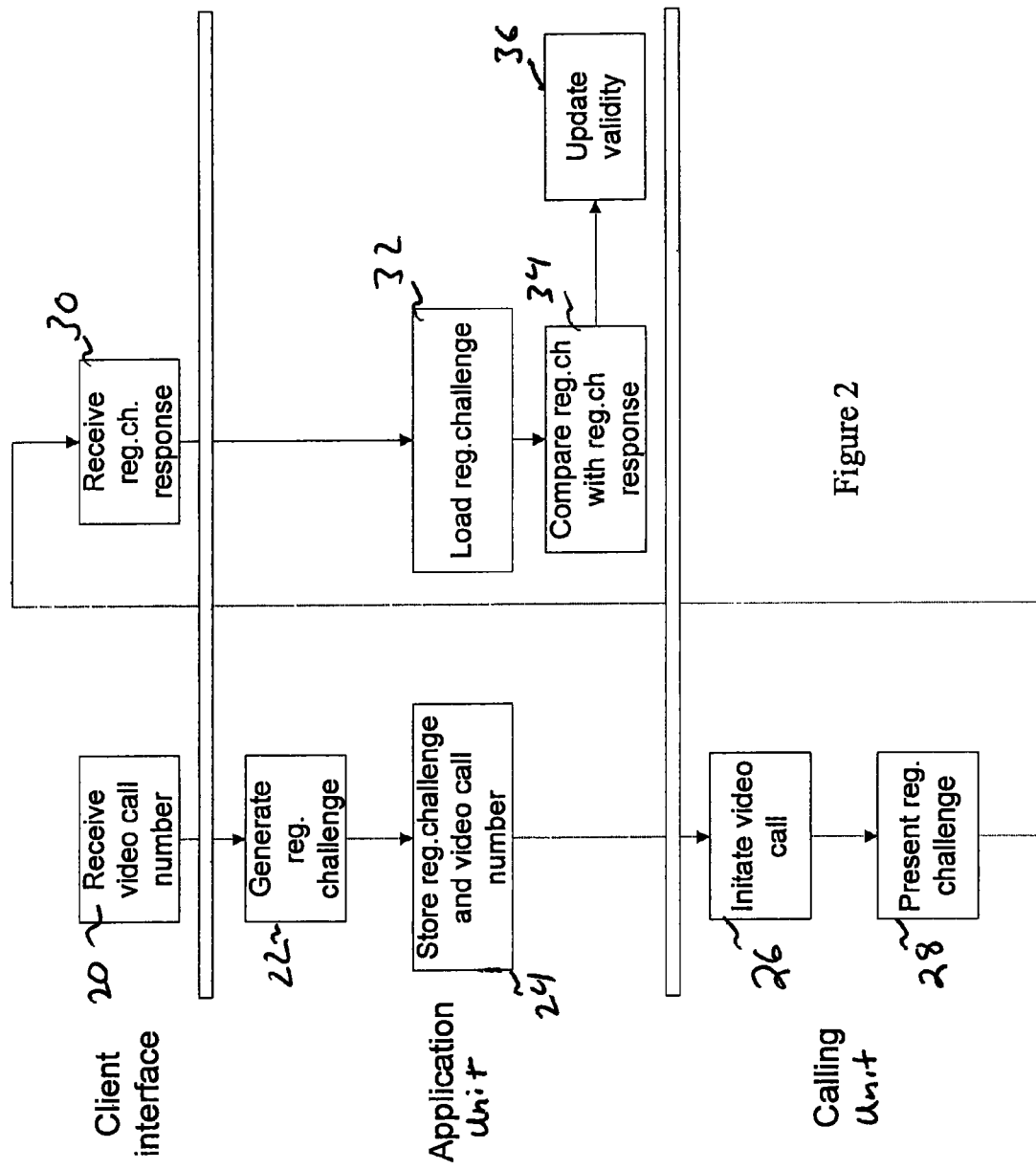
FIG. 2 is a flow chart showing an exemplary communication session.

An exemplary method of verifying a call number entry in a directory is shown in FIG. 2. The method begins in step 20, wherein the client interface 5 receives a video call number for entry in the directory server 4, and submits the video call number to the application unit 6 to initiate the verification of the video call number. The step of transmitting the video call number to the application unit 6 could, for example, be initiated by pressing a "Verify Video call number" button as described above.

When the application unit 6 receives the video call number from the client interface 5, the application unit 6 generates a registration challenge (step 22). The registration challenge is typically a sequence of alphanumeric letters, e.g. 12345, but could be any suitable registration challenge as disclosed below. The application unit 6, in step 24, then stores the registration challenge and the video call number in a session, and submits both the registration challenge and the video call number to the Video calling unit 7.

In step 26, the Video calling unit 7, in response receiving the registration challenge and the video call number, initiates a video call session to the video call number. The video calling unit 7 is typically using one of SIP, H.323 and Jingle media call protocols to initiate the video call session. If the video call session fails, typically if the video calling unit is not receiving a response on a call request, e.g. a SIP INVITE message, an error message is returned to the application unit 6. The application unit 6 then preferably maintains the not verified status of the video call number entry. Alternatively, the status of the video call number entry could be changed to "Not Valid". In yet another alternative, the call number entry may be deleted after failing a predefined number of verification attempts.

Upon successful initiation of the video call session the video call unit 7, in step 28, presents the registration challenge to the user over the video call session. The registration challenge is preferably presented to the user visually, or visually and audibly. After the registration challenge is presented to the user the video call session is disconnected.

The user, being presented with the registration challenge, enters the registration challenge response, e.g. 12345, using the client interface 5. In step 30, the client interface 5 submits the received registration challenge response and the video call number to the application unit 6 to validate the registration challenge response.

Upon receiving the registration challenge response, the application unit 6 in step 32, loads the registration challenge and the video call number saved previously for the same session. In step 34, the application unit 6 compares the saved and entered video call numbers and registration challenge/ registration challenge response respectively, and upon finding an exact match, step 36, the application unit 6 updates the directory unit indicating the video call number is valid. If an exact match is not found, the application unit 6 preferably keeps the not verified status of the video call number entry. Alternatively, the status of the video call number entry could be changed to "Not Valid". In yet another alternative, the call number entry may be deleted after failing a predefined number of verification attempts.

According to one exemplary embodiment, the registration challenge is a CAPCHTA (Completely Automated Public Turing test to tell Computers and Humans Apart) image. Several different CAPCHTA methods are known by a person of ordinary skill in the art, such as 3D CAPCHTA, Image based CAPCHTA and the common text based CAPCHTA, where user enters an alphanumeric sequence from a distorted image that appears on a screen. The use of an alphanumeric CAPCHTA also allows the sequence to be presented audibly to a user having problems reading the distorted alphanumeric sequence.

Figure 3:
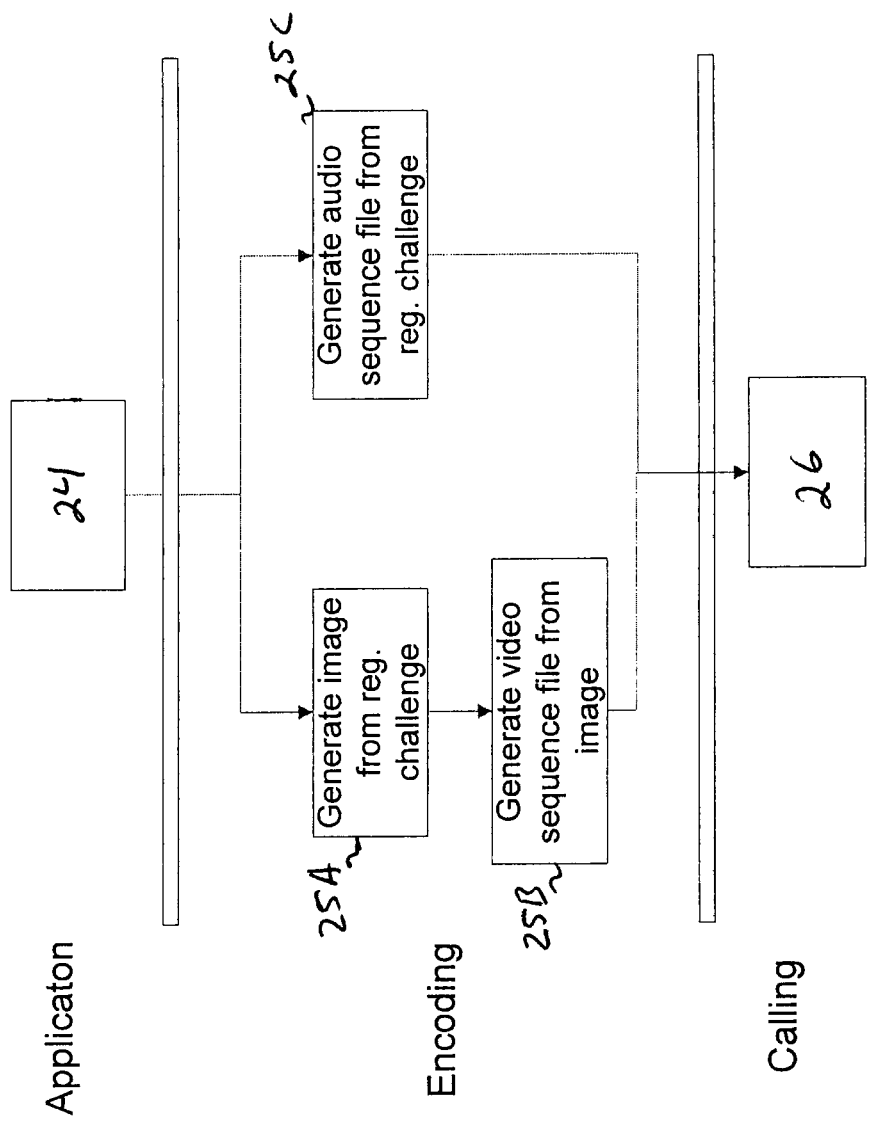
FIG. 3 is a flow chart showing an exemplary embodiment of the communication session of FIG. 2.

FIG. 3 shows one exemplary embodiment of encoding a registration challenge to be presented over a video call session. According to this exemplary embodiment, the Directory server 4 further comprises an encoding unit that is used in the process of FIG. 2 between the application unit 6 and the video calling unit 7. In step 25A, the encoding unit receives the registration challenge from the application unit 6. In one exemplary embodiment, the registration challenge is an alphanumeric sequence generated by the application unit 6. Upon receiving the alphanumeric sequence the encoding unit generates a one image file based on the alphanumeric sequence using any image/CAPTCHA creating library, e.g. ImageMagik library or the ReCAPTCHA Api.

In step 25B, the encoding unit generates a video sequence file by creating multiple copies of the image file and encoding the multiple copies of the image file into a video format. For example, if the video sequence file is encoded using a frame rate of 10 frames per second, and the registration challenge shall be presented for 60 seconds, then the encoding unit generates and encodes 600 images into a video format. This can easily be done using tools known to the person skilled in the art, such as ffmpeg tools. The video format of the video sequence file is typically H.263 or H.264. The video sequence file is then submitted to the Video calling unit 7 as disclosed above to be presented for a user over the video call session.

In yet an alternative embodiment, the encoding unit also comprises an audio encoder. The alphanumeric sequence generated by the application unit 6 is also transmitted to the audio encoder, and in step 25C, the alphanumeric sequence is entered into text-to-speech generator and converted into an audio sequence file. The audio sequence file is then submitted to the Video calling unit 7 as disclosed above to be presented for a user over the video call session.

Figure 4:
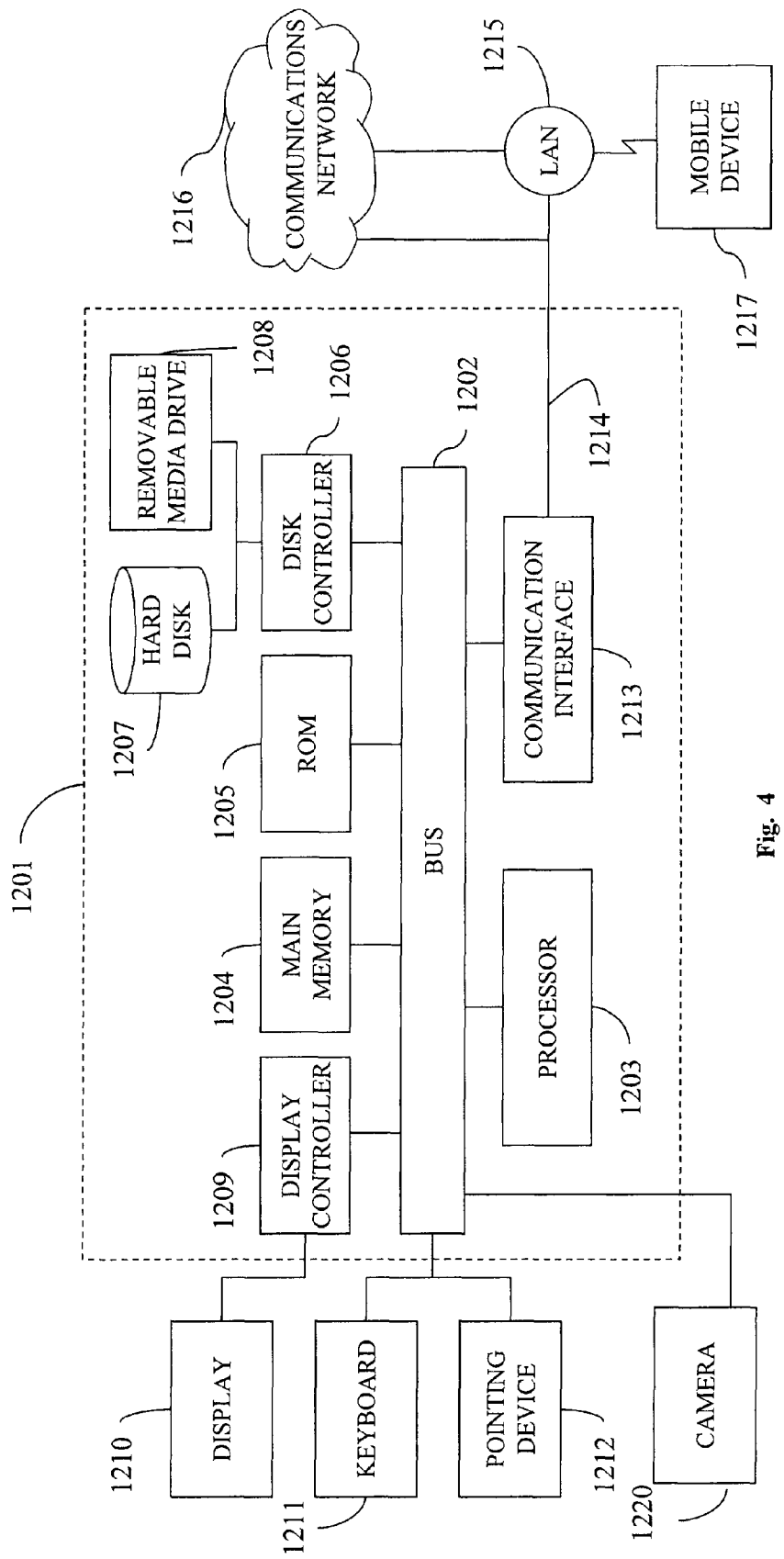
FIG. 4 is an exemplary computer system.

FIG. 4 illustrates a computer system (or server) 1201 upon which an embodiment of the directory server 4 may be implemented, or the hardware that may be included in PC 2 and/or video call endpoint 1. For the directory server 4, the hardware illustrated in FIG. 4 and described below may be used to generate the client interface, implement the application unit, implement the calling unit, to implement the encoding unit, and to implement the audio encoder.

The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210.

The computer system 1201 performs a portion or all of the processing steps in response to the processor 1203 executing one or more sequences of one or more instructions contained in a memory, such as the main memory 1204. Such instructions may be read into the main memory 1204 from another non-transitory computer readable medium, such as a hard disk 1207 or a removable media drive 1208. One or more processors in a multi-processing arrangement may also be employed to execute the sequences of instructions contained in main memory 1204. In alternative embodiments, hardwired circuitry may be used in place of or in combination with software instructions.

As stated above, the computer system 1201 includes at least one non-transitory computer readable medium or memory for holding instructions programmed according to the teachings of the exemplary embodiments discussed herein and for containing data structures, tables, records, or other data described herein. Examples of non-transitory computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium.

Stored on any one or on a combination of non-transitory computer readable media, exemplary embodiments include software for controlling the computer system 1201, for driving a device or devices for implementing functionality discussed herein, and for enabling the computer system 1201 to interact with a human user. Such software may include, but is not limited to, device drivers, operating systems, development tools, and applications software.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

While certain embodiments have been described, these embodiments have been presented by way of example only, and are not intended to limit the scope of the inventions. Indeed, the methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A system comprising:
    a computer that is configured to be communicatively connected to a computer network, the computer including a client interface, an application unit and a video calling unit, wherein the computer is configured to provide a directory of video call numbers,
    the client interface is configured to
        receive a video call number for entry in the directory, and to submit the received video call number to the application unit to initiate verification of the video call number,
        receive a registration challenge response, and submit the received registration challenge response to the application unit, which is configured to validate the registration challenge response;
    the application unit is configured to
        receive the video call number from the client interface for verification,
        generate a registration challenge,
        store the registration challenge and the video call number in a session,
        submit the registration challenge and the video call number to the video calling unit,
        receive the registration challenge response from the client interface,
        load the registration challenge from the session, and upon finding a positive match between the registration challenge and the registration challenge response, update the directory to indicate the video call number is valid; and
    the video calling unit is configured to
        receive the video call number and the registration challenge from the application unit,
        initiate a video call session to the video call number, and upon successful initiation of the video call session, present the registration challenge over the video call session; and
    an encoding unit configured to
        generate an image file based on the registration challenge, and
        generate a video sequence file based on the image file.

2. The system according to claim 1, wherein the registration challenge includes an alphanumeric sequence, and the encoding unit is configured to
    generate the image file based on the alphanumeric sequence, and
    generate the video sequence file by creating multiple copies of the image file and encoding the multiple copies of the image file into a video format.

3. The system according to claim 2, wherein the encoding unit is further configured to generate an audio sequence file based on the alphanumeric sequence using a text-to-speech generator.

4. The system according to claim 2, wherein the video calling unit is configured to present the registration challenge over the video call session by transmitting the video sequence file.

5. The system according to claim 3, wherein the video calling unit is configured to present the registration challenge over the video call session by transmitting the video sequence file and the audio sequence file.

6. The system according to claim 1, wherein the application unit is configured to generate a CAPCHTA image registration challenge.

7. The system according to claim 1, wherein the video calling unit is configured to initiate the video call session using one of SIP, H.323 and Jingle.

8. The system according to claim 2, wherein the encoding unit is configured to encode the video sequence file using one of H.263 and H.264.

9. A method comprising:
    receiving, at a computer, a video call number, wherein the computer includes a client interface connected to a computer network, an application unit, and a video calling unit, and the computer is configured to provide a directory of video call numbers;
    generating, by the application unit, a registration challenge;
    generating, by an encoding unit, an image file based on the registration challenge;
    generating, by the encoding unit, a video sequence file based on the image file;
    initiating, by the video calling unit, a video call session to the video call number;
    presenting the registration challenge over the video call session;
    receiving a registration challenge response entered using the client interface; and upon finding a positive match between the registration challenge and the registration challenge response, updating the directory indicating that the video call number is valid.

10. The method according to claim 9, wherein the generating the registration challenge further includes:
   generating an alphanumeric sequence;
   generating the one image file based on the alphanumeric sequence; and
   generating the video sequence file by creating multiple copies of the image file and encoding the multiple copies of the image file into a video format.

11. The method according to claim 10, wherein the method further comprises:
   generating an audio sequence file based on the alphanumeric sequence using a text-to-speech generator.

12. The method according to claim 9, wherein the presenting includes presenting the registration challenge visually over the video call session.

13. The method according to claim 9, wherein the presenting includes presenting the registration challenge visually and audibly over the video call session.

14. The method according to claim 9, wherein the registration challenge includes a CAPTCHA image.

15. The method according to claim 9, wherein initiating includes initiating the video call session using SIP, 11.323 or Jingle.

16. The method according to claim 10, wherein the video sequence file video format is H.263 or H.264.

17. A non-transitory computer readable storage medium encoded with instructions, which when executed by a computer that provides a directory of video call numbers, causes the computer to implement a method comprising:
   receiving a video call number;
   generating a registration challenge;
   generating, by an encoding unit, an image file based on the registration challenge;
   generating, by the encoding unit, a video sequence file based on the image file;
   initiating a video call session to the video call number;
   presenting the registration challenge over the video call session;
   receiving a registration challenge response entered using the client interface; and
   upon finding a positive match between the registration challenge and the registration challenge response, updating the directory indicating that the video call number is valid.

\* \* \* \* \*